May 1, 1962   E. STUMP   3,031,900
AXLE DRIVE ARRANGEMENT
Filed Nov. 6, 1957   5 Sheets-Sheet 1
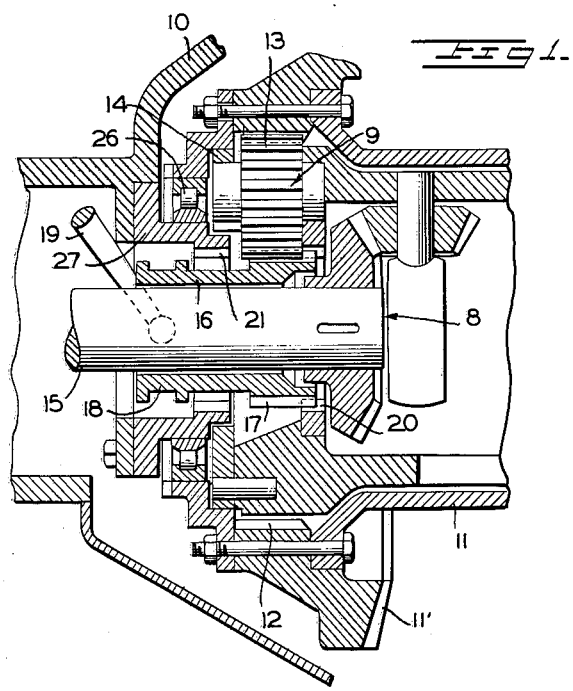
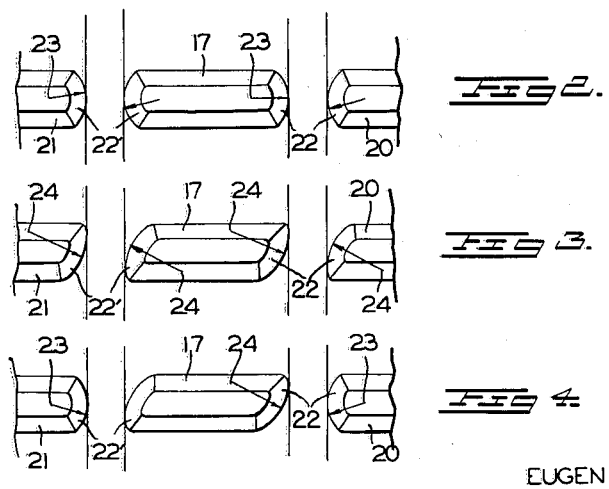
INVENTOR
EUGEN STUMP
BY *Dicke and Cray*
ATTORNEYS May 1, 1962 E. STUMP 3,031,900
AXLE DRIVE ARRANGEMENT
Filed Nov. 6, 1957 5 Sheets-Sheet 2
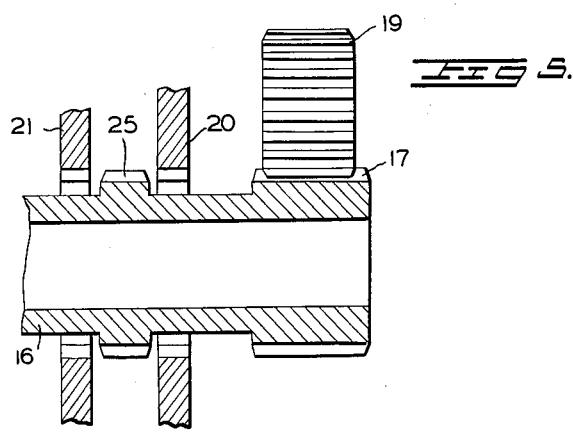
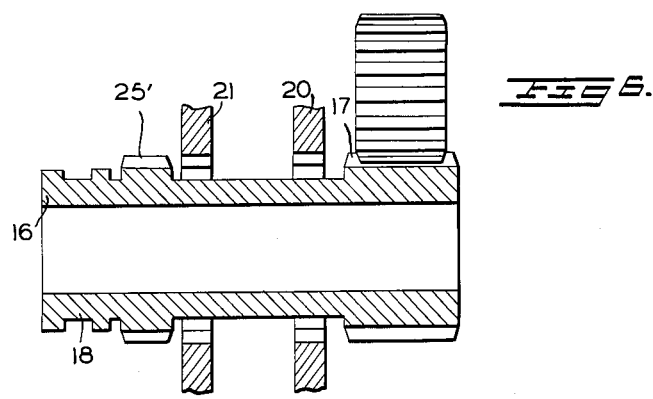
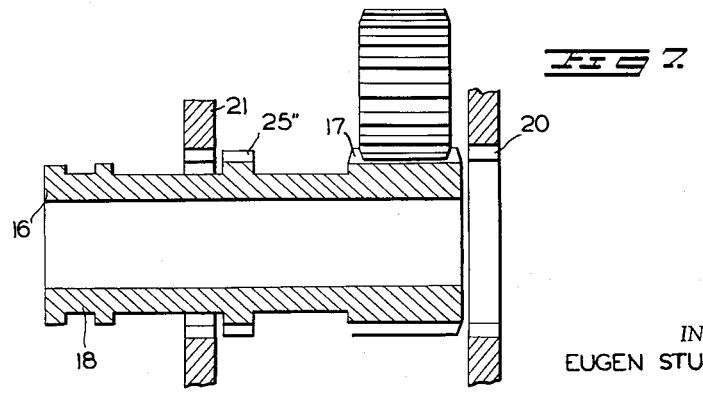
INVENTOR
EUGEN STUMP
BY *Dicke and Craig*
ATTORNEYS

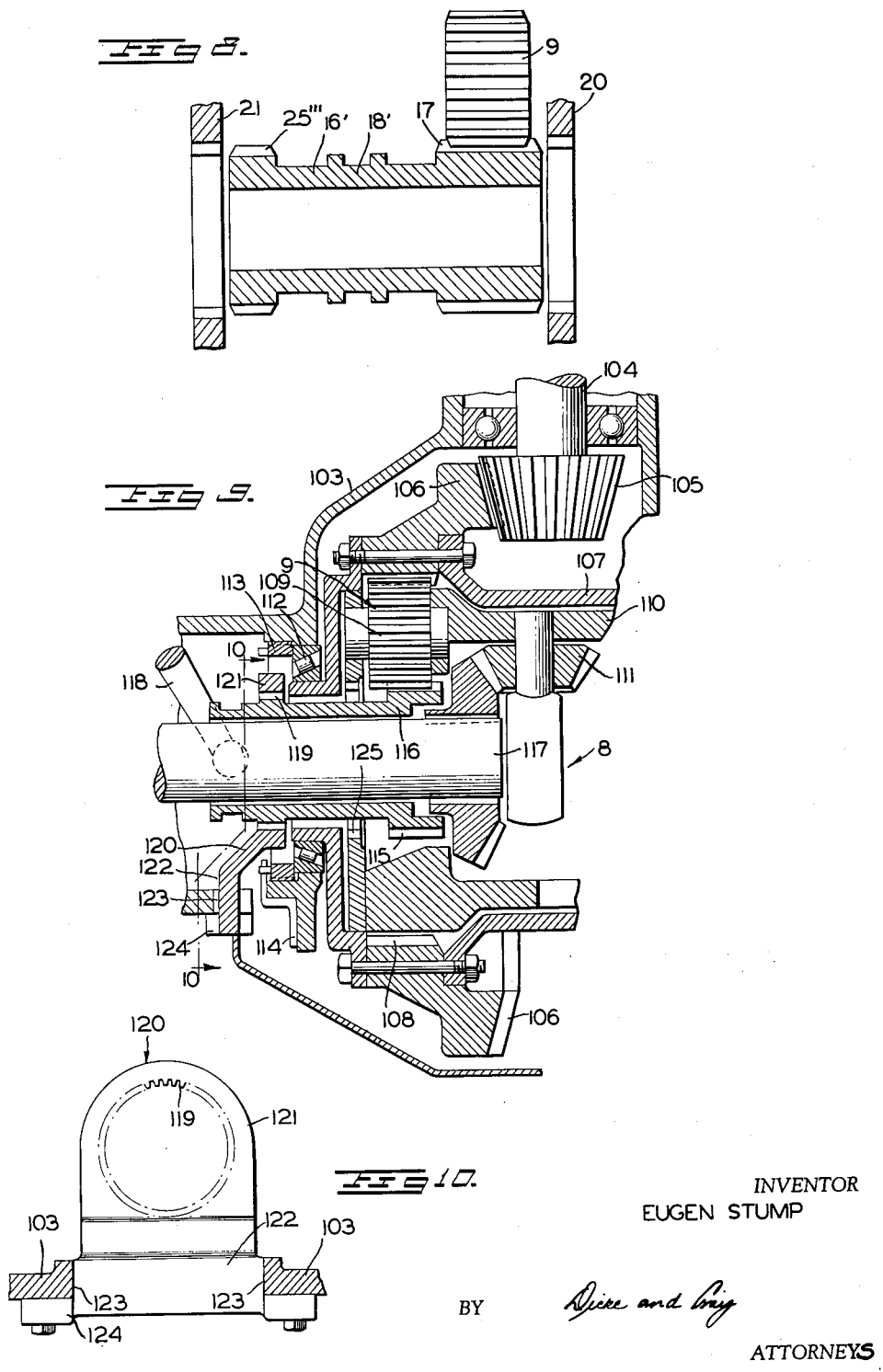

May 1, 1962 E. STUMP 3,031,900
AXLE DRIVE ARRANGEMENT
Filed Nov. 6, 1957 5 Sheets-Sheet 4
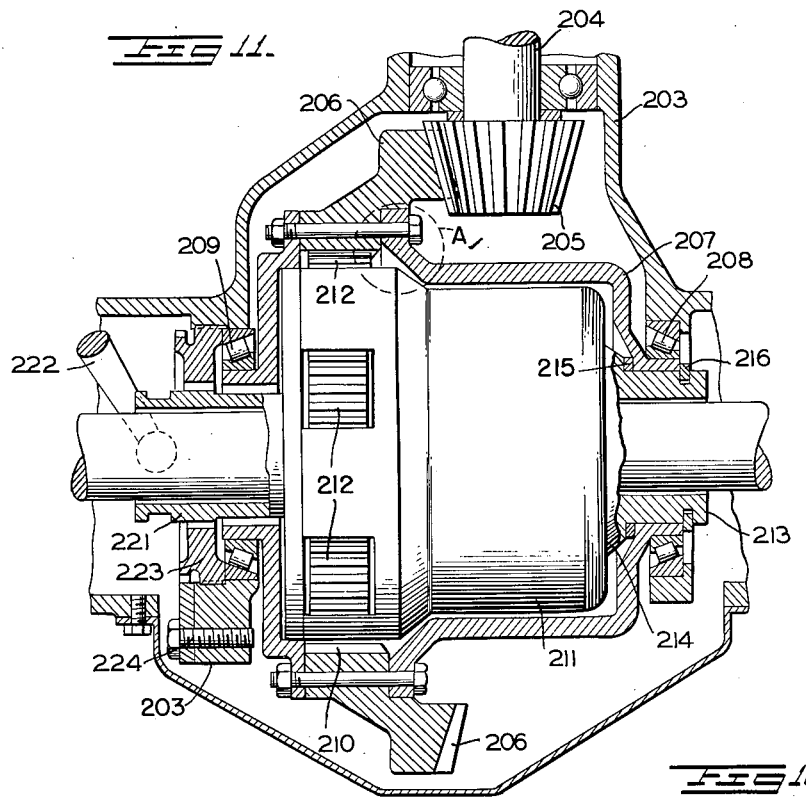
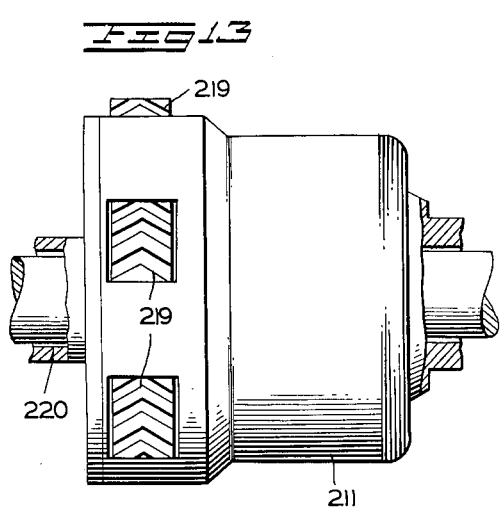
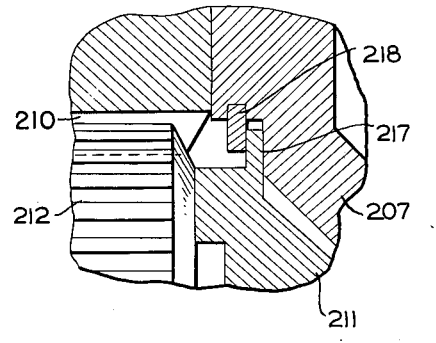
INVENTOR
EUGEN STUMP
BY
ATTORNEYS May 1, 1962     E. STUMP     3,031,900
AXLE DRIVE ARRANGEMENT
Filed Nov. 6, 1957     5 Sheets-Sheet 5
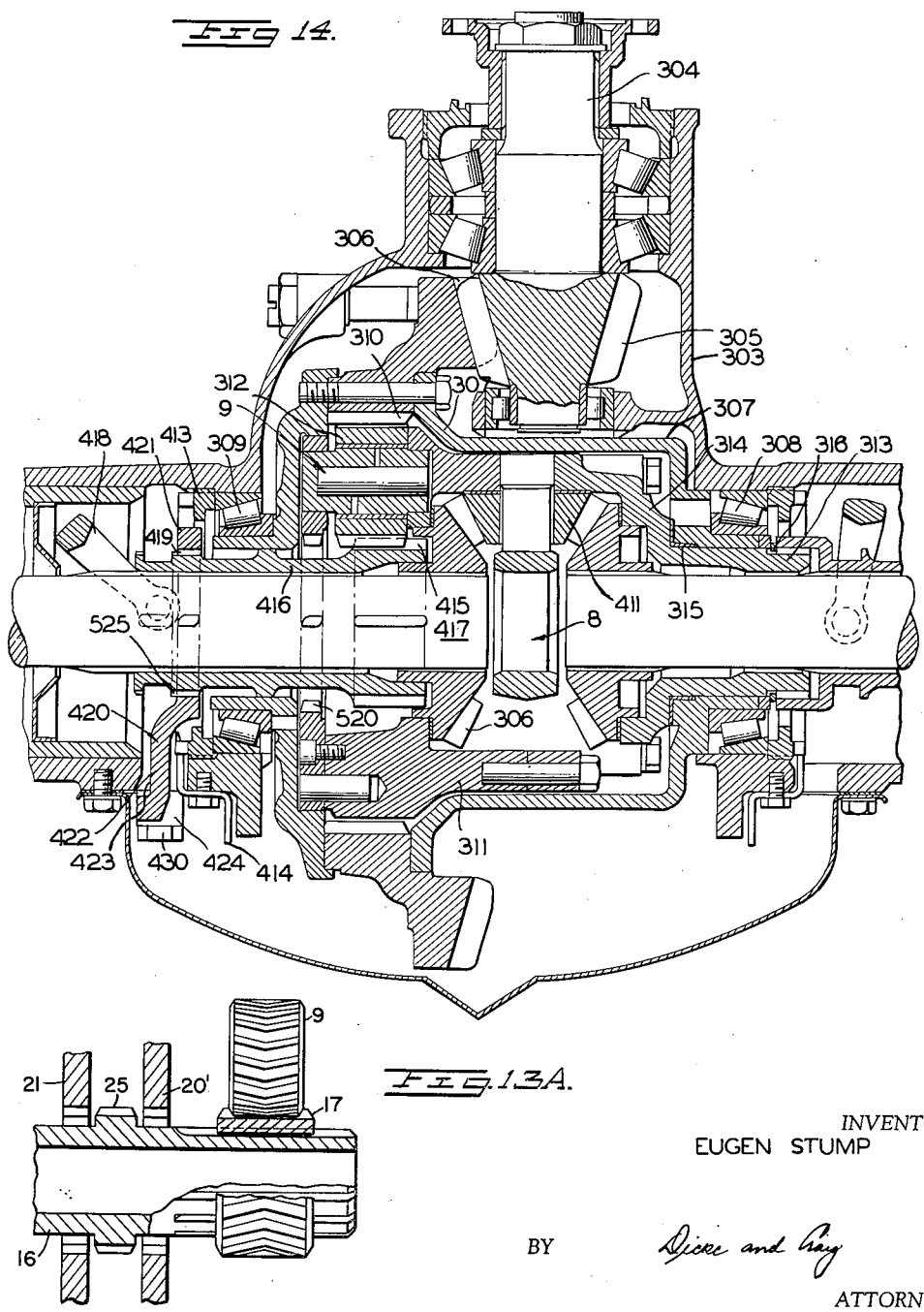
INVENTOR
EUGEN STUMP
BY
ATTORNEYS United States Patent Office 3,031,900
Patented May 1, 1962

3,031,900
AXLE DRIVE ARRANGEMENT
Eugen Stump, Stuttgart-Unterturkheim, Germany, assignor to Daimler-Benz Aktiengesellschaft, Stuttgart-Unterturkheim, Germany
Filed Nov. 6, 1957, Ser. No. 694,798
Claims priority, application Germany Nov. 8, 1956
32 Claims. (Cl. 74—695)

The present invention also relates to an axle drive for motor vehicles provided with a differential gear and with a two-speed change-speed transmission, especially provided with a two-speed planetary gear structurally combined therewith into a unitary assembly, the planet gears of which are in engagement with a shifting sleeve which may be brought selectively into effective connection with the planet carrier or the outer axle gear housing.

Axle drive arrangements are known in the prior art in which the differential is combined with a two-speed planetary gear into a structural unit whereby the planetary gear is usually constructed as an additional speed reduction ratio which may be engaged or disengaged for each of the speeds of the usual change-speed transmission ordinarily found in a motor vehicle, for example, during cross-country drives as described, for example, in my copending United States application Serial No. 628,639, filed December 17, 1956, and entitled "Axle Gear for Motor Vehicles," now Patent No. 2,947,200. The shifting of such an axle drive arrangement may thereby take place by a separate shifting lever. More particularly, the change in transmission ratios takes place in such devices in that the sun gear of the planetary gear is brought selectively into engagement, either directly or indirectly, by means of a part thereof by axial displacement with a further transmission part, for example, with the planet carrier or with a relatively stationary part such as the axle gear housing.

In such axle drives, it is desirable to be able to undertake the changes in speeds or gear ratios as noiselessly as possible without having to build into the axle gear the known synchronizing arrangements. For the installation of such a synchronizing arrangement is not feasible nor practical with such transmissions because the frequency or recurrence of shifting is, generally speaking, only very slight and the installation of the synchronizing arrangement would disproportionately increase the cost of construction of the axle gear drive.

These considerations, therefore, lead to the endeavor to provide in connection with such axle drives an arrangement for noiselessly shifting the same which does not require additional constructional parts and which is as simple and inexpensive as possible in manufacture and assembly thereof.

Accordingly, the present invention aims at providing a practical solution for the problem outlined hereinabove.

In particular, the present invention provides a practical solution therefor in that, with axle drive mechanisms of the type mentioned hereinabove, adjacent side faces of all teeth which are intended for mutual engagement and which are disposed adjacent each other are rounded off in the circumferential direction thereof in accordance with the present invention.

In accordance with a preferred embodiment of the present invention, the rounded-off portions of the side faces of all teeth are alike among each other with respect to the radii of curvature and/or the position of the center points of the radii of curvature for the rounded-off portions. However, at least the rounded-off portions of cooperating side faces of the teeth of adjacent gears or the like are to be alike with each other as regards the radius of curvature and/or position of the center point of the rounded-off portions in order to obtain identical stress conditions and wear and tear conditions of the shifting surfaces thereof.

Furthermore, it is appropriate in connection with the rounded-off portions that the center points thereof are disposed on the axial plane of symmetry of the individual teeth. However, it is to be understood that this does not exclude the possibility that the center points of the rounded-off portions may possibly also be displaced or offset with respect to the axial plane of symmetry in the circumferential direction thereof, and more particularly offset preferably mirror image-like for different side faces of the teeth.

The construction according to the present invention provides a very advantageous soft engagement of the teeth during shifting thereof. By rounding off the side faces of the teeth, the teeth intended for purposes of mutual engagement which are moved relative to one another repel each other for such a length of time until synchronism therebetween occurs. Furthermore, by the use of the rounded-off construction in accordance with the present invention, any difference in the relative velocity of both parts with respect to each other is also taken into consideration. The repelling effect is, therefore, not constant but decreases with increasing advance of the pushing member or driving gear.

In an axle drive arrangement constructed in accordance with the present invention, additional parts such as, for example, synchronizing rings or separate clutches between the parts to be engaged are not necessary so that manufacture and assembly is correspondingly made more simple and less expensive.

These aforementioned advantages which may be attained in accordance with the present invention become even more significant and prominent if, according to a further feature of the present invention, the sun gear itself forms the engageable toothed member which selectively engages with the teeth of the other rings or gears arranged at another transmission part, for example, at the planet carrier or at the relatively stationary axle housing.

In that case, only the last-mentioned toothed rings or gears are required as additional toothed members for purposes of shifting.

In axle gears of the aforementioned type, as described, for example, in my copending application, Serial No. 628,639, filed December 17, 1956, and entitled "Axle Gear for Motor Vehicles," the shifting sleeve is non-rotatably secured in the lower speed with respect to the relatively stationary axle gear housing so that the planet gears of the change-speed transmission may roll off along the external or sun gear provided at or formed by the shifting sleeve. As a result thereof, the shifting sleeve has to transfer or transmit the reaction moment of the planet gears to the axle gear housing. An axle gear drive of the aforementioned type is usually provided with an internally toothed ring or gear for purposes of holding the shifting sleeve stationary which gear or ring is inserted into the axle gear housing and which simultaneously supports the ball bearing of the spur bevel gear housing laterally thereof.

It has been found that with this type of construction the reaction moment of the planetary gear set adversely affects the bearings. The forces transmitted by the shifting sleeve pass over into the bearings and over the bearings also pass over into the internal housing so that the latter as well as the wheels or gears in turn supported therein are disadvantageously affected thereby.

Accordingly, it is also a primary object of the present invention to avoid and eliminate the disadvantages mentioned hereinabove and more particularly to provide an arrangement for preventing these harmful influences of the bearings and/or inner housing.

According to the present invention, this is achieved in an axle drive mechanism of the aforementioned type in that the means for establishing an effective connection of the shifting sleeve with the outer axle gear housing are arranged at a place independent of and separate from the bearing of the planet carrier and are directly connected with the outer axle gear housing.

By reason of the fact that the shifting sleeve in accordance with such a construction is connected with the housing separately and independently of the axle gear bearings, a transmission of the reaction forces to the inner housing or the bearings themselves can no longer take place.

In axle drive arrangements of the type described hereinabove, the planet gears of the change-speed transmission are thereby disposed in or carried by a planet carrier which simultaneously forms the carrier for the planet bevel gears of the differential gear. This common planet carrier is disposed within a surrounding housing assembly at which the bevel spur gear for the drive of the differential is arranged.

It has been found with such prior art devices that the housing assembly at which the spur bevel gear is arranged or forms part thereof is subjected to unavoidable deformations by reason of the various multiple loading and stressing thereof. If these deformations are transmitted to the common planet carrier disposed within the housing assembly, then the common planet carrier might also become deformed which, however, would influence and affect disadvantageously the bearings of the planet gears as well as possibly also the toothed meshing engagement thereof.

Accordingly, a further purpose of the present invention is to prevent that the common planet carrier be influenced or adversely affected by the outer spur bevel bear housing. The aforementioned problem is solved in accordance with the present invention in that with an axle drive of the aforementioned type, the inner common planet carrier is freely rotatably journaled in the axial direction thereof with respect to the surrounding spur bevel gear housing.

According to a preferred embodiment of the present invention, the inner common planet carrier is axially secured with respect to the surrounding spur bevel gear housing at only one place. More particularly, such securing or fastening of the common planet carrier takes place at that location where the inner planet carrier and the surrounding auxiliary spur level gear housing are supported in common in the outer or main housing of the axial drive mechanism.

Accordingly, it is an object of the present invention to provide an arrangement which enables as smooth and as noiseless as possible a shifting of a change-speed transmission built into an axle gear drive mechanism.

It is another object of the present invention to provide a construction for a change-speed transmission for axle gears also provided with a differential which enables smooth and noiseless shifting without the necessity of additional parts.

Still another object of the present invention resides in the provision of a construction of the movable members of a change-speed gear in an axle gear drive mechanism which permits a relatively simple construction reliable in operation and which does not necessitate elaborate constructional parts for purposes of obtaining synchronization.

A further object of the present invention resides in the provision of a change-speed transmission for an axle gear drive mechanism which is simple and sturdy in construction, reliable in operation and inexpensive in manufacture and assembly.

Another object of the present invention is the provision of a construction of movable parts which produces a variable repelling force between the asynchronous parts and which effectively facilitates shifting of the change-speed transmission by taking into consideration the relative rotation speed of the two parts to be engaged without requiring expensive synchronizing arrangements.

It is a further object of the present invention to provide a differential axle gear with a change-speed transmission in which the bearings of the change-speed transmission are relieved of forces, particularly of reaction moments produced in the change-speed transmission.

Still another object of the present invention resides in the provision of a selectively engageable change-speed planetary gear within a differential axle gear in which certain parts of the transmission which are selectively engageable and which, upon engagement, must transmit certain forces to the axle gear housing are so arranged as to relieve the bearings, used ordinarily for purposes of rotatably supporting these parts within the axle gear housing, of those forces, particularly of the reaction moments which occur in the change-speed transmission.

A still further object of the present invention resides in the arrangement of a combined two-speed, differential axle gear for motor vehicles which minimizes wear on certain parts during operation thereof to increase thereby useful life of these parts, particularly as to wear and tear on the bearings.

It is a still further object of the present invention to attain all of the aforementioned advantages in a manner which enables ease of assembly and disassembly of the axle gear.

Still another object of the present invention is to provide an axle drive mechanism for motor vehicles which is compact, provides a two-speed transmission and in which the parts of the transmission are relieved as much as possible of any stresses which might cause deformations of the transmission parts or adversely affect the meshing engagement thereof.

Still a further object of the present invention is the provision of an arrangement for a two-speed axle drive mechanism with a differential gear in which certain parts of the change-speed transmission are so arranged and secured as to relieve the same of stresses which may occur in the axle drive mechanism, particularly in the housing parts thereof.

Still another object of the present invention is to provide maximum reliability and safety of operation of a two-speed axle drive mechanism as well as to extend the length of life thereof by decreasing the wear in the parts thereof.

These and other objects, features and advantages of the present invention will become more obvious from the following description when taken in connection with the accompanying drawing which shows, for purposes of illustration only, several embodiments in accordance with the present invention, and wherein:

FIGURE 1 is a partial longitudinal cross-sectional view through an axle drive mechanism in accordance with the present invention, FIGURES 2 through 4 are partial plan views showing three different embodiments for the shape of the teeth of mutually engageable toothed elements, which may be used in a change-speed transmission for an axle gear in accordance with the present invention, the normally circular tooth portions being shown therein unwound in the plane of the drawing, FIGURES 5 through 8 are partial axial cross-sectional views through the shifting sleeve provided with a hub portion also constituting the sun gear of different embodiments in accordance with the present invention and showing therein the arrangement of the mutually engageable parts, FIGURE 9 is an axial cross-sectional view through a modified embodiment of an axle drive mechanism in accordance with the present invention similar to FIGURE 1, in which the relatively stationary ring member 21, 27 of FIGURE 1 is replaced by a separate intermediate support member secured to the axle gear housing from the outside thereof.

FIGURE 10 is a cross-sectional view taken along line 10—10 of FIGURE 9 and showing the intermediate member and its connection with the axle gear.

FIGURE 11 is an axial cross-sectional view through still another embodiment of an axle gear in accordance with the present invention similar to FIGURES 1 and 9 in which the common planet carrier is relieved of stresses by enabling axial expansion thereof, FIGURE 12 is an enlarged cross-sectional view showing the details of a modified embodiment in accordance with the present invention of the corresponding parts encircled by the circle A in FIGURE 11, FIGURE 13 is a partial side elevational view with certain parts broken away of still a further modified embodiment of an axle gear mechanism in accordance with the present invention similar to FIGURE 11, FIGURE 13A illustrating a shifting member suitable for use in the apparatus of FIGURE 13, and FIGURE 14 is an axial cross-sectional view of an axle drive arrangement in accordance with the present invention embodying a construction containing a combination of some of the features of the present invention.

The present invention consists of an axle gear in which the spur bevel gear of the differential simultaneously forms a housing for a change-speed transmission disposed therein, preferably for the planet carrier of a planetary change-speed gear, and in which the planet carrier of the planetary gear which also simultaneously forms the carrier for the differential planet bevel gears is secured in the axial direction at only one place within the housing formed by the spur bevel gear assembly of the differential gear.

The present invention further consists of a differential axle drive mechanism of the aforementioned type in which the spur bevel gear of the differential gear simultaneously forms an inner or auxiliary housing, and in which a two-speed planetary gear is provided of which the planet carrier also constitutes the planet carrier for the differential bevel gears, and in which the planet gears of the change-speed transmission are in meshing engagement with a shifting sleeve which is selectively engageable either with another part of the planetary gear to lock the same for rotation in unison or with a relatively stationary part of the axle gear, whereby this last-mentioned relatively stationary part is supported on a supporting member secured to the axle gear housing from the outside thereof.

According to the present invention, the side faces of the teeth of adjacent gears intended for mutual engagement are rounded off to facilitate shifting and effectively provide a synchronization device for the change-speed gear.

Referring now to the drawing, wherein like reference numerals are used throughout the various views to designate like parts, and more particularly to FIGURE 1, reference numeral 8 generally designates therein the differential gear which is constructionally combined into a unitary assembly with the two-speed planetary gear generally designated by reference numeral 9. The spur bevel gear 11' of the differential gear 8 which forms part of an auxiliary inner housing assembly 11 is rotatably journalled in the relatively stationary main axle gear housing 10, the spur bevel gear 11' being driven from the engine over the usual Cardan shaft by means of a pinion (not shown). The drive of the planet gears 13 of the two-speed planetary gear 9 takes place over the internal teeth 12 provided within the spur bevel gear 11' and constituting an internal ring gear. The number of planet gears 13 may be one or several, as desired. The planet gears 13 are rotatably supported in the planet carrier 14 which simultaneously therewith constitutes the inner housing for the differential gear 8 which may be constructed in any suitable manner, as for example, disclosed in my aforementioned copending application Serial No. 628,639.

A sleeve-like hub member 16 constituting the shifting sleeve is axially movably mounted on the half axle 15. The sun gear 17 of the two-speed planetary gear 9 is arranged at the sleeve-like hub member 16. Furthermore, the hub member 16 is provided with an annular groove 18 for purposes of engagement with a shifting fork 19 as is well known.

Shifting of the planetary gear takes place in that the sun gear 17 is selectively connected either with the planet carrier 14 or with the relatively stationary axle gear 10. For that purpose, a toothed ring 20 constituting an internal ring gear is provided at the planet carrier 14. In the figure illustrated in the drawing, the sun gear 17 is in meshing engagement with the toothed ring 20. Consequently, in the position shown in the drawing, the planetary gear 9 is locked in itself and thereby rotates, inclusive the sun gear 17, at the rotational speed of the spur bevel gear 11'.

If the hub member 16 is displaced toward the left as viewed in FIGURE 1 by displacement of the annular groove 18 through suitable actuation of shifting lever 19, then the sun gear 17 comes into engagement with the teeth 21 of a ring or gear member which is securely fastened at the main axle gear housing 10 over a sleeve and collar portion 27. The sun gear 17 is held stationary in this manner and the planet gears 13 may roll off along the sun gear 17. The planet carrier 14 rotates now at a reduced speed ratio corresponding to the reduced rotational speed with respect to the spur bevel gear assembly 11.

In order to enable as noiseless as possible a shifting of the planetary gear 9, the mutually adjacent side faces of all teeth which are intended for mutual engagement are rounded off in the circumferential thereof in accordance with the present invention.

In the embodiment according to FIGURE 2, all side or lateral faces of the teeth, i.e, of the teeth of sun gear 17 and of the toothed rings or gears 20 and 21, are rounded off in the same manner so that the rounded-off portions 22 and 22' of mutually adjacent side faces are identical. However, at least each two cooperating side faces of the teeth, for example, side faces 22 or 22' respectively should be constructed and shaped similarly in order to obtain the same wear and stress conditions. By rounding off the teeth, a repelling effect between adjacent gears is achieved which does not remain constant but instead decreases with increasing advance of the sun gear 17 which normally serves as the driving or pushing gear.

The embodiment of FIGURE 2 illustrates a construction in which the center points 23 of the radii of curvature of the rounded-off portions are all disposed on the same axial plane of symmetry of the individual teeth. A completely identical operational effect is obtained with this embodiment in both directions of rotation.

If in special cases one of the two directions of rotation is to be preferred, then the arrangement in accordance with the present invention may be so selected according to FIGURE 3 that the center points 24 for the rounded-off portions are displaced or offset in the circumferential direction with respect to the plane of symmetry.

It is preferable thereby to choose a mirror image-like displacement with respect to the axial plane of symmetry for the different side faces.

FIGURE 4 shows still another modification in accordance with the present invention in which the side faces are rounded off at one of the teeth, for example, at the sun gear 17 with the center points 24 for radii of curvature of the rounded-off portions displaced or offset whereas in the other teeth, for example, in the toothed rings 20 and 21, the rounding-off is such that the center points 23 for the radii of curvature thereof are disposed along the axial plane of symmetry of the individual teeth.

With a construction according to FIGURES 3 and 4, a preference for one of the rotational directions, for example, of the direction of rotation corresponding to forward drive, is obtained and more particularly for shifting to both higher and lower speeds. In each of these illustrated embodiments of FIGURES 3 and 4 there are two pairs of sets of teeth with rounded-off side faces which are to be mutually meshed and at least one of the sets of each pair of sets to be mutually meshed is formed with the center of curvature of the rounded-off portions offset with respect to the central axial planes of the teeth, these offset centers being indicated at the points 24 in the drawings. In FIGURE 3 all of the side faces are offset whereas in FIGURE 4 only one of the sets of side faces of each pair of mutually meshing sets has the offset centers of curvature. The rounded-off tooth end faces present generally smooth convex surfaces.

It is appropriate with respect to the length of the radii of curvature for the rounded-off portions that all teeth be made similar insofar as these radii of curvature are concerned. However, it is understood that the present invention is not limited thereto but that deviations therefrom, for example, by the provision of radii of curvature having different lengths, are possible depending on the particular prevailing conditions.

The arrangement described hereinabove according to which the sun gear 17 itself is intended for engagement with both toothed gears or rings 20 and 21 represents the simplest solution. However, it may not always be possible nor appropriate to realize such an arrangement. In that case, one or two further external toothed arrangements or rings may be provided at the sleeve-like hub member 16 of the sun gear 17 which then take over shifting, i.e., the engagement with the teeth of gears or rings 20 and 21.

For example, FIGURE 5 illustrates one embodiment of the present invention according to which an additional toothed ring or gear 25 is provided on the sleeve-like hub member or shifting sleeve 16. In the neutral position of the change-speed gear 9, the toothed ring 25 is disposed between the two toothed rings 20'and 21, of which the former like ring 20 of FIGURE 1 is secured at the planet carrier 14 and the latter at the axle gear housing 10 as described in connection with FIGURE 1. Shifting takes place in the manner already described hereinabove by axial displacement of the hub member 16 whereby not the sun gear 17 but the toothed ring 25 is operative to provide the shifting engagement. The preceding disclosure in connection with the rounded-off portions of adjacent side faces of the individual teeth intended for mutual engagement, as described hereinabove in connection with FIGURES 2 to 4, is also applicable to the tooth construction of ring gears 20', 25 and 21 of FIGURE 5.

In both of the embodiments described in connection with FIGURES 1 and 5, the same toothed ring or gear at the hub member 16, i.e., the sun gear 17 itself in FIGURE 1 or the additional toothed ring 25 in FIGURE 5, is intended for engagement with the toothed ring 20 or 20' at the planet carrier 14 as well as with the toothed ring 21 at the axle gear housing 10, i.e., is intended for purposes of engaging both speeds. However, it is also possible to provide a separate toothed arrangement at the hub member 16 for engagement with each of the two toothed rings 20 and 21 or 20' and 21.

Such a construction is illustrated in the embodiment according to FIGURE 6. The sun gear 17 of this embodiment is thereby intended for engagement with the toothed ring 20' at the planet carrier 14, namely, for purposes of engaging the high speed whereas an additional toothed arrangement 25' at the hub member 16 is intended for engagement with the toothed ring 21 at the relatively stationary axle gear housing 10, namely, for purposes of engaging the lower speed. The position of the shifting sleeve or hub member 16 shown in the drawing is that corresponding to neutral. If the hub member 16 is moved toward the right, then the low speed is engaged whereas with corresponding movement toward the left as viewed in FIGURE 6, the high speed of the planetary change-speed gear 9 is engaged.

The arrangement according to FIGURE 6 may also be so modified that instead of the toothed ring 20', the toothed ring 20 is provided and that instead of the toothed ring 25' a toothed ring 25" is provided, as illustrated in FIGURE 7. In both the embodiments according to FIGURES 6 and 7, the side faces of the individual teeth of rings 20, 20', 21, 25' and 25" may again be constructed in accordance with the preceding disclosure.

In all of the aforementioned arrangements of FIGURES 1 and 5 to 7, the annular groove 18 for purposes of engagement of the shifting fork 19 is disposed at the end of the hub member 16 so that all of the toothed arrangements are disposed on the same side thereof. In this manner, it is possible to achieve a construction in which the path for the forces within the hub member 16 is kept as short as possible. However, in some cases, it is desirable to provide a support of the hub member 16 within the relatively stationary axle gear housing 10 at a point which is as far removed as possible from the bearing 26 (FIGURE 1) of the rotating part in the axle gear housing 10.

For that purpose, it may be appropriate to provide a construction according to FIGURE 8 in which the annular groove 18' is arranged in the center of the shifting hub member 16' so that the toothed ring 21 secured at the axle gear housing 10 and the toothed arrangement 25' on the hub member 16' cooperating therewith are disposed to one side of the annular groove 18' whereas all the other toothed arrangements are disposed to the other side thereof. This arrangement prevents that forces which are produced by the support moment of the hub member 16 at the stationary housing 10 may pass over into the bearing 26 and thereby adversely affect the rotating part of the axle gear drive. Again, the teeth which are intended to be selectively engaged with each other may be constructed in accordance with the disclosure of FIGURES 2 to 4 as described hereinabove.

Referring now to FIGURES 9 and 10 of the drawing, wherein like reference numerals are used to designate like parts, reference numeral 103 designates the outer axle gear housing in which the entire axle gear drive mechanism is arranged and rotatably supported. The drive takes place from the engine (not shown) and shaft 104 over pinion or bevel gear 105 which is in meshing engagement with the large spur bevel gear 106 of the differential gear. The spur bevel gear 106 is rigidly connected with and forms parts of an auxiliary inner housing assembly 107 which is formed of several parts for purposes of ease of assembly and installation as described in my aforementioned copending application and which surrounds the inner planetary gear of the change-speed transmission. An internal toothed arrangement 108 forming an internal ring gear within the spur bevel gear 106 drives the planet gears 109 of the change-speed transmission 9 so that the drive takes place from bevel gear 105 over spur gear 106 and internal gear teeth 108 to the planet gears 109 which are appropriately supported by a planet carrier 110 of suitable construction. Any appropriate number of planet gears 109 may again be provided, for example, one or several planet gears. The planet carrier 110 simultaneously forms the planet carrier for the bevel planet gears 111 of the differential gear 3.

The auxiliary or spur bevel gear housing 107 is rotatably journaled with respect to the main or outer axle gear housing 103 by means of tapered or conical roller bearings 112. The bearing 112 is secured within the axle gear housing 103 by means of a threaded ring 113 whereby any appropriate locking means 114 is provided which prevents any possible automatic disengagement of the threaded ring 113.

On the other side of the axle gear, which is not shown in the drawing, the bearing may take place in the same or at least in an analogous manner and construction. In other words, a similar tapered or conical bearing secured in a similar manner in the main axle gear housing 103 may be arranged in the right-hand portion of the axle gear, as seen in FIGURE 9, to support the other parts located to the right of the portion of the axle gear shown in the drawing, such as the parts used for locking the differential gear, as more fully described in my aforementioned copending application Serial No. 628,639.

The planet gears 109 are in meshing engagement with the external teeth 115 provided on the shifting sleeve 116 which effectively form a sun gear for the planet gears 109. The shifting sleeve 116 is supported on the half axle 117 and may be axially displaced thereon by a shifting fork or lever 118.

In the position illustrated in FIGURE 9, the lower speed is engaged and the shifting sleeve 116 is non-rotatably secured over a separate, intermediate member, generally designated by reference numeral 120, with respect to the main or outer axle gear housing 103. The intermediate member is formed by a locking auxiliary support member 120 provided with internal teeth 119 with which the shifting sleeve 116 engages. Upon engagement of shifting sleeve 115 with the teeth 119 of auxiliary support member 120, the planet gears 109 may roll off along the shifting sleeve 116 so that a relative movement between the surrounding auxiliary or spur bevel gear housing 107 and the planet carrier 110 takes place in the sense of a reduction of the rotational speed of the driving member.

The lug-like locking support member 120 which serves as the intermediate member consists of an annularly shaped portion 121 which surrounds the shifting sleeve 116 in a bushing-like manner and which includes the engaging elements for the shifting sleeve 116, for example, the internal teeth 119. A lateral projection 122 is provided at the annular portion 121 which includes two seating surfaces 123 and which is operative to secure the shifting sleeve 116 non-rotatably with respect to the main axle gear housing 103. The seating surfaces 123 are disposed parallel to each other and the distance from one another is slightly larger than the outer diameter of the annularly shaped portion 121. Such a construction makes it possible to insert the entire support member 120 through a corresponding housing aperture from the outside thereof.

A flange 124 is provided for securing the support member 120 at the axle gear housing 103 which flange 124 is disposed in a plane at right angle to the seating surfaces 123 and which is threadably secured at the axle gear housing 103, for example, by means of bolts or the like. The locking support member 120 is so constructed that the annular shaped portion 121 thereof is disposed in a plane which is displaced or offset with respect to the lateral projection 122 so that the overall dimension of the shifting sleeve is reduced thereby.

The reaction moment of the planet 109 is therefore transferred from the shifting sleeve 116 over the lug-like locking member 120 serving as intermediate support member to the axle gear housing 103 without adversely affecting the bearing 112 and therewith also the auxiliary or inner housing 107.

In order to further increase this effect, the place of connection between the shifting sleeve 116 and the axle gear housing 103 may be arranged as far away as possible from the bearing 112 regardless of whether the connection takes place over an intermediate member or not. Thus, it might be possible, for example, to extend the shifting sleeve 116 beyond the point of engagement thereof with the shifting fork 118, similar to that seen in FIGURE 8, and to provide thereat an engagement either directly or indirectly with the housing, for example, by a jaw-like engagement. In connection therewith, it should also be mentioned that instead of the toothed arrangement 119 any other type of clutching arrangement which provides a form-locking engagement, such as claw clutches, may be provided. Furthermore, the arrangement and construction of the lateral projection 122 and of the seating surfaces 123 may also be modified and adapted to other conditions depending on the prevailing requirements of the particular construction.

During shifting into the high speed, the shifting sleeve 116 is moved by the shifting lever 118 toward the left as shown in FIGURE 9. As a result of such displacement, the meshing teeth 119 are disengaged, and the teeth 115 of the shifting sleeve 116 come into engagement with the toothed ring 125 provided at the planet carrier 110. This prevents a relative rotation of the planet carrier 109 so that the planet carrier 109 and the spur bevel gear housing 107 rotate now at the same rotational speed whereby the shifting sleeve 116 is also taken along by reason of the fact that the planetary gear is locked in itself. The differential gear is not affected by the shifting process. It is operative in the same manner in both speeds of the planetary gear and may additionally be provided with a locking arrangement which is arranged appropriately on the side of the axial gear opposite the planetary gear, i.e., on the side not shown in the drawing as disclosed in the aforementioned copending application, Serial No. 628,639.

Referring now to FIGURES 11 to 13 of the drawing, wherein like reference numerals again are used to designate like parts, and more particularly to FIGURE 11, the axle drive mechanism shown therein is arranged within an outer axle gear housing 203. The drive takes place from the engine (not shown) through a shaft 204 which drives the large spur bevel gear 206 by means of the pinion or bevel gear 205. The spur bevel gear 206 is arranged at an inner housing 207, which in turn is rotatably supported within the outer axle gear housing 203 by means of appropriate bearings 208 and 209, such as ball or roller bearings, respectively. The spur bevel gear housing 207 with which the spur bevel gear 206 is rigidly connected is formed of several parts for reasons of facilitated assembly, as more fully described in my aforementioned copending application.

The drive of the inner common planet carrier 211 takes place from the spur bevel gear 206 and therewith from the spur bevel gear housing assembly 207 by means of the internal teeth 210 forming an internal ring gear provided thereat over the planet gears 212 which are suitably supported on the common planet carrier 211 and of which one or several may be provided. The planet gears 212 form effectively again the two-speed change-speed transmission. The bevel-wheel differential gear which may be of any suitable construction known in the prior art, for example, as described in my aforementioned copending application, is disposed adjacent to the planet gears 212 within the common planet carrier 211, i.e., to the right of the planet gears 212 as viewed in FIGURE 11.

The planet gears 212 are in meshing engagement with the external teeth of an axially adjustable shifting sleeve 221 which effectively constitute a sun gear for the planet gears 212. The shifting sleeve 221 which may be selectively actuated in any suitable manner, for example, by a shifting fork 222, may be selectively engaged thereby with the common planet carrier 211 for purposes of obtaining the higher speed and with the outer housing 203 of the axle gear for purposes of obtaining the lower speed of the two-speed change-speed transmission. For that purpose, the common planet carrier 211 is provided as in the foregoing embodiments with a hub portion (not shown) having internal teeth while a relatively stationary internal ring gear 223 is rigidly secured in any suitable manner, for example, by means of bolts 224 or the like with the outer casing 203 of the axle gear, as also more fully described in my aforementioned copending application.

The inner common planet carrier 211 terminates at the right end thereof, as seen in FIGURE 11, in an axial shaft collar 213 which is rotatably supported within the main or outer housing 203 of the axle gear at the same place and by means of the same ball bearings 208 as the inner or auxiliary housing 207 formed by the spur bevel gear assembly. The common planet carrier 211 is also secured in the axial direction thereof at this particular place. The common planet carrier 211 passes over into the shaft collar 213 by means of a conical collar portion 214 and is supported with the collar portion 214 thereof at the auxiliary or inner spur bevel gear housing 207 by means of an intermediate disk 215 of any suitable material inserted therebetween. The common planet carrier 211 together with the conical collar portion 214 and the shaft collar 213 is also secured at this place in the opposite axial direction by any suitable means, for example, by means of a split ring 216 or the like. No other means of securing the common planet carrier 211 with respect to the auxiliary or inner housing 207 is provided in a construction in accordance with the present invention so that the common planet carrier 211 may freely expand in the axial direction from this place of fastening thereof and cannot be adversely affected by deformations of the spur bevel gear housing 207.

It may be appropriate to axially secure the common planet carrier 211 at that place at which the transmission of forces from the auxiliary or spur bevel gear housing 207 to the inner planet carrier 211 takes place, or at least as close as possible to this place. This transmission of force in a construction in accordance with the present invention takes place over the internal teeth of gear ring 210 to the planet gears 212.

Such an arrangement is shown in the embodiment according to FIGURE 12 which shows the corresponding parts of the enlarged portion of the area indicated by the dotted circle A of FIGURE 11.

The common planet carrier 211 is provided in this embodiment with a radially outwardly extending collar 217 directly adjacent the planet gears 212. The common planet carrier 211 abuts axially by means of the collar 217 against the spur bevel gear housing 207 and is secured thereat by means of a split ring 218 or the like, it being understood that rings 215 and 216 of FIGURE 11 are not used in this instance.

It is also possible to secure the common planet carrier 211 by means of a construction in which the planet gears 212 of the two-speed change-speed transmission are provided with a herringbone toothed arrangement, as shown in the embodiment according to FIGURE 13. A corresponding herringbone toothed arrangement also has to be provided then at the internal ring gear arranged at the spur bevel gear housing 207 and at the external gear constituted by shifting sleeve generally designated by reference numeral 220. The shifting sleeve 220 in that case is formed of two parts. The outer part of the shifting sleeve 220 in that case is arranged nonrotatably with respect to the inner part thereof but is axially displaceable with respect thereto. The outer part is thereby provided with a corresponding herringbone toothed arrangement for meshing engagement with the herringbone toothed arrangement of the planet gears 219 while the inner part of the shifting sleeve is provided with means for selective engagement thereof with the common planet carrier 211 or with the outer axle gear housing 203 provided, for example, with radial serrations. During shifting, the inner part of the shifting sleeve 220 is thereby axially displaced whereas the outer part thereof provided with the herringbone teeth remains axially fixed with respect to the planet gears 219. In that manner, any friction between the abutting collar may be eliminated. The two-partite type shifting sleeve may be as seen in FIGURE 13A which is similar to that shown in FIGURE 5 except that the teeth 19 and 17 are hereinabove and the latter is rotatable with but axially slidable on the axially shiftable member.

FIGURE 14 illustrates one embodiment in which certain features of the various modifications described hereinabove are combined into a single constructional unit. More particularly, FIGURE 14 illustrates an embodiment of an axle drive mechanism in accordance with the present invention in which the differential and planetary gear generally designated by reference numerals 8 and 9, respectively, are arranged in a manner similar to FIGURE 11.

The drive again takes place from the engine (not shown) over the shaft 304 and pinion 305 to the spur bevel gear 306 which itself is combined with other parts to form a spur bevel gear housing assembly 307. The differential gear includes one or several planet gears 312 which are in meshing engagement with the teeth 310 provided in the spur bevel gear 306 and forming an internal ring gear therein. The planet gears 312 are rotatably supported on the planet carrier 311 which constitutes also the planet carrier for the differential bevel gears 411. The spur bevel gear or inner housing assembly 307 is rotatably supported in the main housing 303 by means of roller bearings 308 and 309.

The common planet carrier 311 terminates in a shaft collar 313 over a conical portion 314.

As described in connection with FIGURE 11, the common carrier 311 abuts against the inner housing 307 by means of a flange portion and the interposition of a disk 315 of suitable material. In the opposite axial direction, the common planet carrier 311 is secured axially relative to the housing 307 by means of a split ring 316 or the like.

It is thus seen that the parts and elements in FIGURE 14 corresponding to those of FIGURE 11 are designated by corresponding reference numerals of the three-hundred series. By such a construction, as pointed out hereinabove, the common carrier is free to expand in the axial direction to relieve the parts of stresses due to deformations or the like.

It is also understood that the common carrier 311 of FIGURE 14 may be secured in the manner shown in FIGURES 12 and 13, FIGURE 14 being only illustrative of the combination of certain features of the various embodiments described hereinabove.

Instead of providing a ring 223 for purposes of selective engagement with the shifting sleeve 221 of FIGURE 11, FIGURE 14 provides a separate support member generally designated by reference numeral 420 which is constructed in a manner similar to the construction of the support member 120 of FIGURES 9 and 10. The parts and elements of FIGURE 14 which correspond to those of FIGURES 9 and 10 are designated in FIGURE 14 by the four-hundred series.

The separate support member 420 includes an annularly shaped portion 421 provided with internal teeth 419 for engagement with corresponding teeth 525 provided externally on the shifting sleeve 416. The lug-like support member 420 is provided with an offset portion 422 and seating surfaces 423. The support member 420 again is also provided with a flange portion 424 extending in a plane at right angle to the seating surface 423 for purposes of connection with the axle gear main housing 303 from the outside thereof in any suitable manner, for example, by means of bolts 430.

It is thus seen that in the embodiment of FIGURE 14 the construction of the support member 420 enables effective relieving of the bearings as described in connection with FIGURES 9 and 10.

Furthermore, the teeth 419 provided in the annularly shaped ring portion 421, the teeth 525 provided at the shifting sleeve or hub member 416, the teeth 520 constituting an internally toothed ring rigidly connected with the common planet carrier 311 as well as the sun gear 415 are rounded off as shown in the embodiment of FIGURE 4 whereby the teeth 525 and 415 are provided with rounded-off portions having the center point of the radius of curvature thereof disposed on the axial plane of symmetry while the center points of the radii of curvature of the teeth 419 and 520 are offset with respect to the axial plane of symmetry of the individual teeth and more particularly in a mirror image-like manner, i.e., the rounded-off portions are similar but their centers of curvature are offset in opposite directions circumferentially relative the axial plane of symmetry of the teeth.

While FIGURE 14 thus follows the arrangement analogous to FIGURE 4, it is understood that this is only for purposes of illustration and that the arrangement may also be modified in accordance with the teachings of FIGURES 2 and 3 of the present application.

It is also noteworthy that the shifting sleeve in hub member 416 which is actuated by the shifting lever 418 is of the construction as shown in FIGURE 6 herein. However, it is also understood that the actual construction thereof may be varied in accordance with the disclosure herein of FIGURES 1, 5, 7 and 8.

The differential gear in accordance with the present invention may also be provided in each case with a locking mechanism to lock the differential as more fully disclosed in my aforementioned copending application whereby the teeth may be rounded off, if so desired, in accordance with any one of the various embodiments in accordance with the present disclosure. The actuation of the change-speed transmission and of the locking mechanism for the differential gear may take place in any suitable manner, for example, independently of one another or by means of a common linkage including a lost-motion arrangement, as more fully described in the aforementioned copending application.

Furthermore, the various features in accordance with the present invention may be combined at will, i.e., the actual construction may include the features of FIGURES 1 through 8, and/or FIGURES 9 and 10 and/or of FIGURES 11 through 13, any appropriate combination depending on the particular requirements being within the scope of the present invention.

While I have shown and described several embodiments in accordance with the present invention, it is thus obvious that the same is not limited to the specific embodiments described but is susceptible of many changes and modifications within the scope and spirit of the present invention, and I intend to cover all such changes and modifications as encompassed by the appended claims.

I claim:

1. An axle gear drive mechanism for motor vehicles having a relatively stationary part, comprising differential gear means and two-speed planetary gear means connected in series driving relationship, said differential gear means and said planetary gear means being combined into a constructional unitary assembly, said planetary gear means including planet gears and shifting means comprising an axially movable shifting member having a plurality of toothed elements including elements forming a sun gear engaged with said planet gears, a first set of toothed elements secured to said relatively stationary part, and a further set of toothed elements forming part of said planetary gear means, said shifting member being movable axially to two different positions during operation of said planetary gear means to selectively engage, in one of said positions, a set of toothed elements thereof with said first set of toothed elements to secure the sun gear of said planetary gear means against rotation and to engage, in the other position, a set of toothed elements thereof with said further set of toothed elements to lock said sun gear with respect to said planet gears engaged therewith, the faces of the selectively engageable sets of toothed elements being rounded off to repel each other upon contact during relative rotation of said elements and to facilitate shifting and synchronization of said planetary gear means, the rounded-off faces of at least one set of each two sets of teeth to be mutually meshed having centers of curvature offset with respect to the axial center planes of said teeth, said rounded-off tooth faces presenting generally smooth convex surfaces.

2. An axle drive mechanism according to claim 1, wherein all of the teeth of two sets of teeth to be mutually meshed have rounded-off faces with centers of curvature offset with respect to the axial center planes of said teeth.

3. An axle drive mechanism according to claim 2, wherein the offset centers of curvature for the teeth of said two last-mentioned sets of teeth to be mutually meshed are displaced in a like manner but in opposite circumferential directions with respect to each other.

4. An axle drive mechanism according to claim 1, wherein the rounded-off faces of one set of teeth have their centers of curvature disposed on the axial plane of symmetry of the respective teeth and the centers of curvature of the teeth in the set engageable therewith are displaced with respect to the axial planes of symmetry of the teeth of said last-mentioned set.

5. An axle gear drive mechanism for motor vehicles having a relatively stationary part, comprising differential gear means and a two-speed planetary gear means combined with said differential gear means into a constructional unitary assembly, said planetary gear means including axially movable shifting means simultaneously forming the sun gear of said planetary gear means, said shifting means being movable axially during operation of the transmission and including elements for selective engagement with another element of said planetary gear means or with an element at said relatively stationary part, each of said toothed elements having a set of teeth to be mutually meshed with a set of teeth of another element to be engaged therewith, the side faces of the teeth of the elements selectively engageable, including the element at said relatively stationary part, the elements of said shifting means and said another element, being rounded-off to repel each other during relative rotation of said element and to facilitate shifting and synchronization of said planetary gear means, said side faces of at least one set of each two sets of teeth to be mutually meshed having centers of curvature offset with respect to the axial center planes of the respective teeth, said rounded-off tooth faces presenting generally smooth convex surfaces, said sun gear itself being selectively engageable with said another element and with said relatively stationary part.

6. An axle gear drive mechanism for motor vehicles having a relatively stationary part, comprising differential gear means and a two-speed planetary gear means combined with said differential gear means into a constructional unitary assembly, said planetary gear means including axially movable shifting means simultaneously forming the sun gear of said planetary gear means, said shifting means being movable axially during operation of the transmission and including elements for selective engagement with another element of said planetary gear means or with an element at said relatively stationary part, each of said toothed elements having a set of teeth to be mutually meshed with a set of teeth of another element to be engaged therewith, the side faces of the teeth of the elements selectively engageable, including the element at said relatively stationary part, the elements of said shifting means and said another element, being rounded-off to repel each other during relative rotation of said element and to facilitate shifting and synchronization of said planetary gear means, said side faces of at least one set of each two sets of teeth to be mutually meshed having centers of curvature offset with respect to the axial center planes of the respective teeth, said rounded-off tooth faces presenting generally smooth convex surfaces, said axially movable shifting means being provided with external teeth other than at said sun gear for selective engagement with either said another element or said relatively stationary part.

7. An axle gear drive mechanism for motor vehicles having a relatively stationary part, comprising differential gear means and a two-speed planetary gear means combined with said differential gear means into a constructional unitary assembly, said planetary gear means including axially movable shifting means simultaneously forming the sun gear of said planetary gear means, said shifting means being movable axially during operation of the transmission and including elements for selective engagement with another element of said planetary gear means or with an element at said relatively stationary part, each of said toothed elements having a set of teeth to be mutually meshed with a set of teeth of another element to be engaged therewith, the side faces of the teeth of the elements selectively engageable, including the element at said relatively stationary part, the elements of said shifting means and said another element, being rounded-off to repel each other during relative rotation of said element and to facilitate shifting and synchronization of said planetary gear means, said side faces of at least one set of each two sets of teeth to be mutually meshed having centers of curvature offset with respect to the axial center planes of the respective teeth, said rounded-off tooth faces presenting generally smooth convex surfaces, said shifting means being provided with an annular groove intermediate its ends for engagement with a shifting lever, the toothed arrangements provided on said shifting means being disposed on both sides of said annular groove.

8. An axle gear drive mechanism for motor vehicles having a relatively stationary part, comprising differential gear means and a two-speed planetary gear means combined with said differential gear means into a constructional unitary assembly, said planetary gear means including axially movable shifting means simultaneously forming the sun gear of said planetary gear means, said shifting means being movable axially during operation of the transmission and including elements for selective engagement with another element of said planetary gear means or with an element at said relatively stationary part, each of said toothed elements having a set of teeth to be mutually meshed with a set of teeth of another element to be engaged therewith, the side faces of the teeth of the elements selectively engageable, including the element at said relatively stationary part, the elements of said shifting means and said another element, being rounded-off to repel each other during relative rotation of said element and to facilitate shifting and synchronization of said planetary gear means, said side faces of at least one set of each two sets of teeth to be mutually meshed having centers of curvature offset with respect to the axial center planes of the respective teeth, said rounded-off tooth faces presenting generally smooth convex surfaces, said planetary gear means including a planet carrier having means constituting an internally toothed ring adapted for engagement with said sun gear to lock said planetary gear upon engagement thereof, said relatively stationary part being constituted by a second toothed ring provided with internal teeth adapted for engagement with said sun gear, said second toothed ring including a sleeve and flange portion for connection with said drive mechanism.

9. An axle gear drive mechanism according to claim 8, wherein said shifting means is provided with an annularly-shaped groove for engagement with a shifting fork, said shifting means being provided with another set of external teeth on the side of said annular groove opposite said sun gear adapted for engagement with said toothed element at said stationary part so as to space the same as far away from said sun gear as possible.

10. An axle drive for motor vehicles comprising a main axle gear housing, means within said main axle gear housing including spur bevel gear means forming an inner housing and differential gear means, change-speed transmission means combined structurally with said differential gear means into a unitary assembly and including a planetary gear set, said planetary gear set including a planet carrier adapted to freely expand in the axial direction thereof and simultaneously forming the planet carrier for said differential gear means, and means for axially securing said common planet carrier with respect to said inner housing at only one place to enable free axial expansion thereof and thereby relieve the same of harmful stresses.

11. An axle drive according to claim 10, further comprising means for rotatably supporting said inner housing at axially spaced points in said main housing, said one place coinciding approximately with one of the supporting points of said last-mentioned means.

12. An axle drive according to claim 10, wherein said one place is disposed in close proximity to the place where the transmission of forces between said spur bevel gear means and said planet carrier takes place.

13. An axle drive according to claim 10, wherein said common planet carrier is provided with a collar portion, and said axially securing means including split ring means for securing said common carrier with said collar portion against said inner housing surrounding the same.

14. An axle drive according to claim 10, wherein said spur bevel gear means is provided with internal teeth in engagement with the planet gears of said planetary gear set, said teeth and said planetary gears being provided with herringbone-shaped teeth for mutual engagement to thereby secure said planet carrier in the axial direction.

15. An axle drive according to claim 14 further comprising two-partite shifting sleeve means for shifting said change-speed transmission means.

16. An axle drive according to claim 10, further comprising a relatively stationary part adapted to cooperate with one of the elements of said change-speed transmission means, and means for securing said relatively stationary part to said main housing from the outside thereof.

17. An axle drive according to claim 10, wherein the elements of said change-speed transmission means intended for selective engagement with one another have rounded-off side faces to facilitate shifting and producing a non-constant repelling force between relatively rotating parts adapted to be connected with each other during synchronization thereof.

18. An axle drive mechanism with a housing for motor vehicles comprising a relatively stationary part, differential gear means within said housing, change-speed transmission means including a plurality of toothed elements also within said housing and combined into a unitary assembly with said differential gear means, bearing means for rotatably supporting said transmission means in said housing, shifting means selectively operable to provide a higher speed and a lower speed by alternate engagement with said relatively stationary part and with one of said transmission elements, and means for securing said relatively stationary part at said housing at a place separate and independent of said bearing means.

19. An axle drive mechanism according to claim 18, wherein the teeth of said transmission means, of said shifting means and of said relatively stationary part adapted for selective engagement with one another are rounded off to facilitate shifting and effectively provide synchronization.

20. An axle drive mechanism according to claim 18, wherein said transmission means includes a planet carrier, and wherein said differential gear means includes an inner housing surrounding said planet carrier, said differential gear means being operatively connected with said planet carrier, and means for securing said planet carrier within said inner housing to enable free axial expansion thereof at least in one direction.

21. An axle drive according to claim 18, wherein said relatively stationary part is provided with an annularly-shaped portion for engagement with said shifting means.

22. An axle drive mechanism according to claim 21, wherein said relatively stationary part is provided with seating surfaces complementary to seating surfaces provided at said housing.

23. An axle drive mechanism according to claim 18, wherein said housing is provided with an aperture laterally of said axle, said relatively stationary part including an annularly-shaped portion provided with internal teeth for engagement with said shifting means and with a laterally offset portion having seating surfaces complementary to the seating surfaces in said housing provided by said aperture, the external diameter of said annular portion being slightly less than the space between said seating surfaces to enable insertion of said annular portion into said housing from the outside thereof.

24. An axle drive mechanism according to claim 18, wherein said relatively stationary part includes an annular portion and a lateral projection offset with respect to said annular part in the direction of the axis of said shifting means to reduce the necessary length of said shifting means.

25. An axle drive mechanism with an axle gear housing for motor vehicles comprising differential gear means, change-speed transmission means including a planet carrier with at least one planet gear mounted thereon, shifting sleeve means in meshing engagement with said planet gear, relatively stationary means adapted to be secured to said axle gear housing, means for selectively shifting said shifting sleeve means for selective engagement either with said planet carrier to thereby lock the same or with said relatively stationary means, said relatively stationary means being in the form of a separate support member provided with internal complementary engaging means for engagement with said shifting sleeve means, said axle gear housing being provided with an aperture for insertion therethrough from the outside thereof of said relatively stationary means, and means provided at said relatively stationary means for connecting the latter with said axle gear housing from the outside thereof.

26. An axle drive mechanism according to claim 25, wherein said last-mentioned means includes seating means constituted by parallel seating surfaces which are parallel to each other and parallel to the axis of said shifting sleeve means.

27. An axle drive mechanism according to claim 26, further comprising flange means at said relatively stationary means disposed in a plane perpendicular to said seating means adapted to provide a connection between said relatively stationary means and said housing.

28. An axle drive mechanism with a housing for motor vehicles comprising relatively stationary means, differential gear means within said housing, change-speed transmission means within said housing and including a plurality of elements, shifting sleeve means in meshing engagement with one of said elements, said relatively stationary means being adapted to be secured to said axle gear housing, means for selectively shifting said shifting sleeve means for selective engagement either with another one of said elements or with said relatively stationary means, said relatively stationary means constituting a separate support member provided with internal complementary engaging means for engagement with said shifting sleeve means, bearing means for said transmission means, and means for securing said stationary means to said housing at a place separate and independent from said bearing means to thereby relieve said bearing means of reaction moments caused in said transmission means.

29. An axle drive mechanism according to claim 28, further comprising means for axially securing one of said transmission elements with respect to said differential gear means at only one place to enable free axial expansion and limited self-adjustment thereof in order to prevent the occurrence of stresses and deformations.

30. An axle drive mechanism according to claim 28, wherein said relatively stationary means, said another one of said transmission elements and said shifting means are provided with teeth having rounded-off portions to facilitate engagement and synchronization thereof.

31. An axle gear drive mechanism for motor vehicles comprising a relatively stationary part, differential gear means and two-speed change-speed transmission means combined with said differential gear means into a constructional unit, said transmission means including a plurality of toothed elements, one of said elements being rotatable and axially movable during operation of the transmission for selective engagement with another rotating element of said transmission means or with an element at said relatively stationary part, said elements each having teeth, and the side faces of the teeth of the elements selectively engageable with one another being rounded-off to repel each other during asynchronous relative rotation of said elements and to facilitate synchronization and engagement thereof and therewith shifting of said transmission means and means for rotatably supporting and axially securing one of said toothed elements other than said axially movable element of said transmission means at only one place to enable axial expansion thereof.

32. An axle gear drive mechanism according to claim 31, wherein said relatively stationary part is a separate member inserted into and secured to said drive mechanism from the outside thereof and means for securing said relatively stationary part to said drive mechanism from the outside thereof.

References Cited in the file of this patent

UNITED STATES PATENTS

| | | |
|---|---|---|
| Re. 15,490 | Starr | Nov. 14, 1922 |
| Re. 15,932 | Evans | Oct. 21, 1924 |
| 1,329,535 | McGrath | Feb. 3, 1920 |
| 1,403,819 | Stowers et al. | Jan. 17, 1922 |
| 1,491,481 | Huetter | Apr. 22, 1924 |
| 1,530,205 | Ruckstell | Mar. 17, 1925 |
| 1,623,212 | Starr | Apr. 5, 1927 |
| 1,815,639 | Weidmaier | July 21, 1931 |
| 1,866,270 | Schoonmaker | July 5, 1932 |
| 2,178,900 | Starr | Nov. 7, 1939 |
| 2,466,683 | Buckendale | Apr. 12, 1949 |